US012687113B1

(12) United States Patent
Hogberg et al.

(10) Patent No.: US 12,687,113 B1
(45) Date of Patent: Jul. 21, 2026

(54) TURBINE ROTOR BLADE AIRFOIL PROFILE

(71) Applicant: GE Vernova Infrastructure Technology LLC, Greenville, SC (US)

(72) Inventors: Nicholas Alvin Hogberg, Warsaw (PL); Nathaniel James Tracy, Greenville, SC (US); Dennis Scott Holloway, Simpsonville, SC (US); Randall Richard Good, Simpsonville, SC (US); Gunnar Leif Siden, Greenville, SC (US); Evan Andrew Sewall, Greer, SC (US); Stephen Walter Newman, Greenville, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 19/321,636

(22) Filed: Sep. 8, 2025

(51) Int. Cl.
*F01D 5/14* (2006.01)
*F01D 25/12* (2006.01)

(52) U.S. Cl.
CPC ............. *F01D 5/141* (2013.01); *F01D 25/12* (2013.01); *F05D 2240/30* (2013.01); *F05D 2250/74* (2013.01)

(58) Field of Classification Search
CPC ............................. F01D 5/141; F05D 2250/74
See application file for complete search history.

(56) References Cited

U.S. PATENT DOCUMENTS 6,450,770 B1 9/2002 Wang et al.
6,779,977 B2 * 8/2004 Lagrange ................ F01D 5/142 416/DIG. 2
7,527,473 B2 5/2009 Humanchuk et al.
7,731,483 B2 6/2010 DeLong et al.
8,439,645 B2 * 5/2013 Tsifourdaris ............ F01D 5/141 416/223 R
9,957,804 B2 5/2018 Chouhan et al.
10,533,440 B2 1/2020 Brozyna et al.
11,441,427 B1 * 9/2022 Deivernois ............. F01D 5/141
11,480,056 B1 * 10/2022 Kim ........................ F01D 5/141
12,018,585 B2 * 6/2024 Blohm ...................... G06T 5/92
12,215,598 B1 * 2/2025 McKeever .............. F01D 5/141
2018/0328178 A1 11/2018 Brozyna et al.
2022/0349419 A1 * 11/2022 Deivernois ............... F02C 3/04

* cited by examiner

*Primary Examiner* — Courtney D Heinle
*Assistant Examiner* — Cameron A Corday
(74) *Attorney, Agent, or Firm* — Charlotte Wilson; James Pemrick; Hoffman Warnick LLC

(57) ABSTRACT

Various embodiments of the disclosure include turbine rotor blades and systems employing such blades. Various embodiments include a turbine rotor blade having: an airfoil having an airfoil shape having a nominal profile substantially in accordance with Cartesian coordinate values of X, Y and Z set forth in TABLE I and originating at an origin at a pressure side, aftmost point of an endwall coupled to the airfoil. The Cartesian coordinate values are non-dimensional values of from 0% to 100% convertible to distances by multiplying the values by a height of the airfoil expressed in units of distance. The X and Y values are connected by smooth continuing arcs to define airfoil profile sections at each distance Z along at least a portion of the airfoil, the airfoil profile sections at the Z distances being joined smoothly with one another to form the nominal profile.

13 Claims, 8 Drawing Sheets

TURBINE ROTOR BLADE AIRFOIL PROFILE

TECHNICAL FIELD

The subject matter disclosed herein relates to turbomachines. More particularly, the subject matter disclosed herein relates to a turbine airfoil profile for turbine rotor blades.

BACKGROUND

Some jet aircraft and simple or combined cycle power plant systems employ turbines, or so-called turbomachines, in their configuration and operation. Some of these turbines employ airfoils (e.g., turbine nozzles and blades), which during operation are exposed to fluid flows. These airfoils are configured to aerodynamically interact with the fluid flows and to generate energy from these fluid flows as part of power generation. For example, the airfoils may be used to create thrust, to convert kinetic energy to mechanical energy, and/or to convert thermal energy to mechanical energy. As a result of this interaction and conversion, the aerodynamic characteristics of these airfoils may result in losses in system and turbine operation, performance, thrust, efficiency, and power.

BRIEF DESCRIPTION

All aspects, examples and features mentioned below can be combined in any technically possible way.

An aspect of the disclosure includes a turbine rotor blade comprising: an airfoil having: a suction side, a pressure side opposing the suction side, a leading edge spanning between the pressure side and the suction side, and a trailing edge opposing the leading edge and spanning between the pressure side and the suction side; and an endwall connected with the airfoil along the suction side, the pressure side, the trailing edge and the leading edge, the endwall defining an origin at a pressure side, aftmost point; wherein the airfoil has a shape having a nominal profile substantially in accordance with Cartesian coordinate values of X, Y and Z set forth in TABLE I and originating at the origin, wherein the Cartesian coordinate values are non-dimensional values of from 0% to 100% convertible to distances by multiplying the values by a height of the airfoil expressed in units of distance, and wherein X and Y values connected by smooth continuing arcs define airfoil profile sections at each distance Z along at least a portion of the airfoil, the airfoil profile sections at the Z distances being joined smoothly with one another to form the nominal profile.

Another aspect of the disclosure includes any of the preceding aspects, and the turbine rotor blade includes a first stage blade.

Another aspect of the disclosure includes any of the preceding aspects, and further comprising a fillet connecting a surface of the endwall to a surface of the airfoil.

Another aspect of the disclosure includes any of the preceding aspects, and the shape having the nominal profile substantially in accordance with the Cartesian coordinate values of X, Y and Z set forth in TABLE I includes the airfoil profile sections defined within 10% and 92% of the height of the airfoil.

A second aspect of the disclosure includes a turbine rotor blade stage for a turbine section of a turbomachine, the turbine rotor blade stage comprising: a set of turbine rotor blades, the set of turbine rotor blades including at least one turbine rotor blade having: an airfoil having: a suction side, a pressure side opposing the suction side, a leading edge spanning between the pressure side and the suction side, and a trailing edge opposing the leading edge and spanning between the pressure side and the suction side; and an endwall connected with the airfoil along the suction side, the pressure side, the trailing edge and the leading edge, the endwall defining an origin at a pressure side, aftmost point; wherein the airfoil has a shape having a nominal profile substantially in accordance with Cartesian coordinate values of X, Y and Z set forth in TABLE I and originating at the origin, wherein the Cartesian coordinate values are non-dimensional values of from 0% to 100% convertible to distances by multiplying the values by a height of the airfoil expressed in units of distance, and wherein X and Y values connected by smooth continuing arcs define airfoil profile sections at each distance Z along at least a portion of the airfoil, the airfoil profile sections at the Z distances being joined smoothly with one another to form the nominal profile.

Another aspect of the disclosure includes any of the preceding aspects, and the turbine rotor blade includes a first stage blade.

Another aspect of the disclosure includes any of the preceding aspects, and further comprising a fillet connecting a surface of the endwall to a surface of the airfoil.

Another aspect of the disclosure includes any of the preceding aspects, and the shape having the nominal profile substantially in accordance with the Cartesian coordinate values of X, Y and Z set forth in TABLE I includes the airfoil profile sections defined within 10% and 92% of the height of the airfoil.

A third aspect of the disclosure includes a turbine section comprising a plurality of turbine stages each having a plurality of turbine rotor blades, each of the turbine rotor blades in a respective turbine stage comprising: an airfoil having: a suction side, a pressure side opposing the suction side, a leading edge spanning between the pressure side and the suction side, and a trailing edge opposing the leading edge and spanning between the pressure side and the suction side; and at least one endwall connected with the airfoil along the suction side, the pressure side, the trailing edge and the leading edge, the endwall defining an origin at a pressure side, aftmost point; wherein the airfoil has a shape having a nominal profile substantially in accordance with Cartesian coordinate values of X, Y and Z set forth in TABLE I and originating at the origin, wherein the Cartesian coordinate values are non-dimensional values of from 0% to 100% convertible to distances by multiplying the values by a height of the airfoil expressed in units of distance, and wherein X and Y values connected by smooth continuing arcs define airfoil profile sections at each distance Z along at least a portion of the airfoil, the airfoil profile sections at the Z distances being joined smoothly with one another to form the nominal profile.

Another aspect of the disclosure includes any of the preceding aspects, and the respective turbine stage is a first turbine stage, and the plurality of turbine rotor blades includes first stage blades.

Another aspect of the disclosure includes any of the preceding aspects, and further comprising a fillet connecting a surface of the endwall to a surface of the airfoil.

Another aspect of the disclosure includes any of the preceding aspects, and the shape having the nominal profile substantially in accordance with the Cartesian coordinate values of X, Y and Z set forth in TABLE I includes the airfoil profile sections defined within 10% and 92% of the height of the airfoil.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
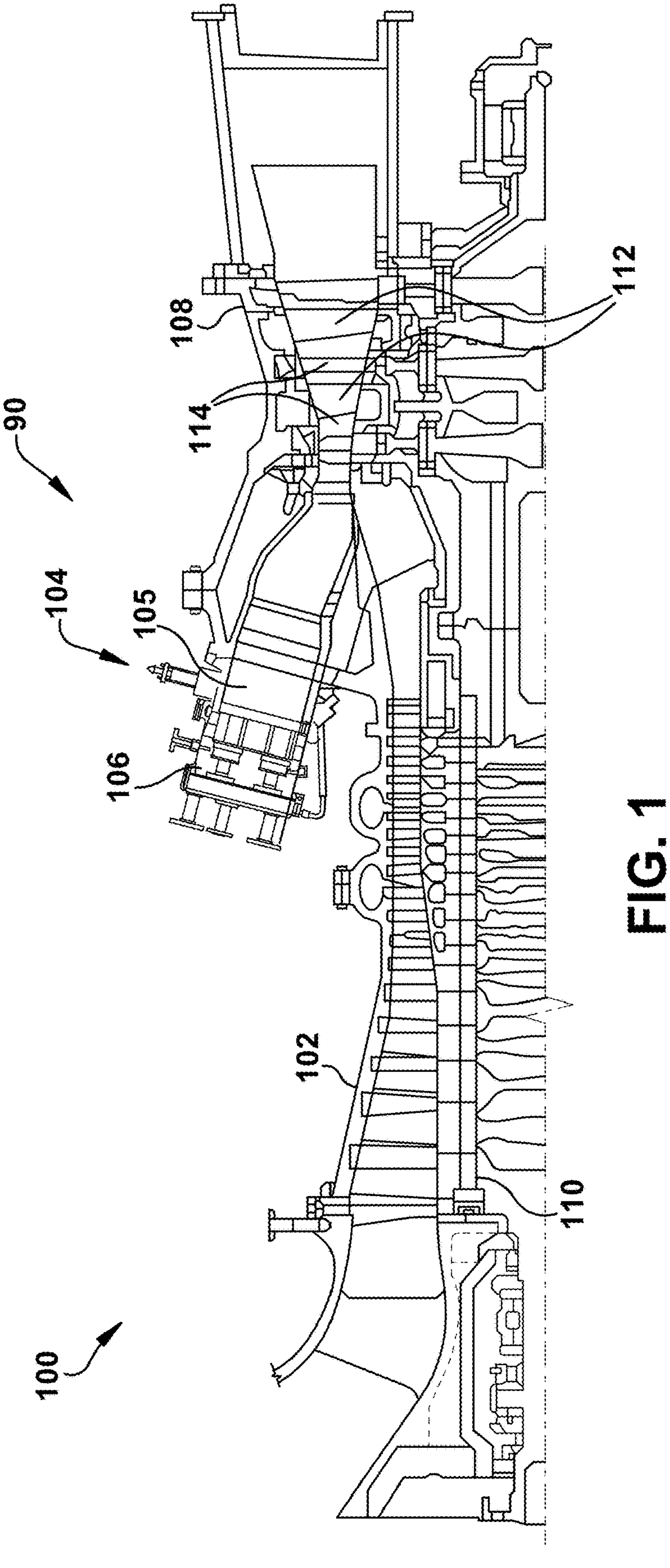
FIG. 1 shows a simplified cross-sectional view of an illustrative turbomachine.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current technology, it will become necessary to select certain terminology when referring to and describing relevant machine components within a turbomachine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine section or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor section of the engine, and "aft" referring to the rearward or turbine section of the engine. The terms "forwardmost" and "aftmost," without any further specificity, refer to locations that closest to the front or compressor section of the engine, or closest to the rearward or turbine section end of the engine, respectively.

It is often required to describe parts that are disposed at different radial positions with regard to a center axis. The term "radial" refers to movement or position perpendicular to an axis, e.g., an axis of a turbine section. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis, e.g., an axis of a turbine section. Finally, the term "circumferential" refers to movement or position around an axis. It will be appreciated that such terms may be applied in relation to the center axis of the turbomachine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described feature or element may or may not be present and that the description includes instances where the feature is present and instances where it is not.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, no intervening elements or layers are present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As noted herein, various aspects of the disclosure are directed toward turbine rotor blades that rotate (hereinafter, "blade" or "turbine rotor blade"). Various embodiments include a turbine rotor blade having an airfoil with an airfoil shape having a nominal profile substantially in accordance with Cartesian coordinate values of X, Y and Z set forth in TABLE I and originating at an origin at a pressure side, aftmost point of an endwall coupled to the airfoil. The Cartesian coordinate values are non-dimensional values of from 0% to 100% (i.e., between 0 and 1) convertible to distances by multiplying the values by a height of the airfoil expressed in units of distance. The X and Y values are connected by smooth continuing arcs that define airfoil profile sections at each distance Z along at least a portion of the airfoil, and the profile sections at the Z distances are joined smoothly with one another to form the nominal airfoil profile. The geometry provides, among other things, a tailored airfoil leading edge geometry that provides a reduction in local heat transfer coefficient. The reduced heat transfer coupled with an improved ability to package cooling holes closer to the leading edge due to the leading edge shape, results in considerable decrease of local temperatures and subsequently a substantial increase in part life and reduced outages for repair. The specific airfoil leading edge geometry employed is also chosen such that aerodynamic performance is substantially maintained, and decreases in turbine efficiency are minimized.

Referring to the drawings, FIG. 1 is a schematic view of an illustrative non-limiting turbomachine 90 in the form of a combustion turbine or gas turbine (GT) system 100 (hereinafter, "GT system 100"). GT system 100 includes a compressor section 102 and a combustion section 104. Combustion section 104 includes a plurality of combustors 105 and related fuel nozzle assemblies 106. GT system 100 also includes a turbine section 108 and a common rotor compressor/turbine shaft 110 (hereinafter referred to as "rotor shaft 110").

In one non-limiting embodiment, GT system 100 is a 7E AGP engine, commercially available from GE Vernova, Cambridge, MA, USA. The present disclosure is not limited to any one particular GT system and may be implanted in connection with other engines including, for example, the other HA, F, B, LM, GT, TM and E-class engine models of GE Vernova, and engine models of other companies. Further, the teachings of the disclosure are not necessarily applicable to only a GT system and may be applied to other types of turbomachines, e.g., steam turbines, jet engines, compressors, etc.

Figure 2:
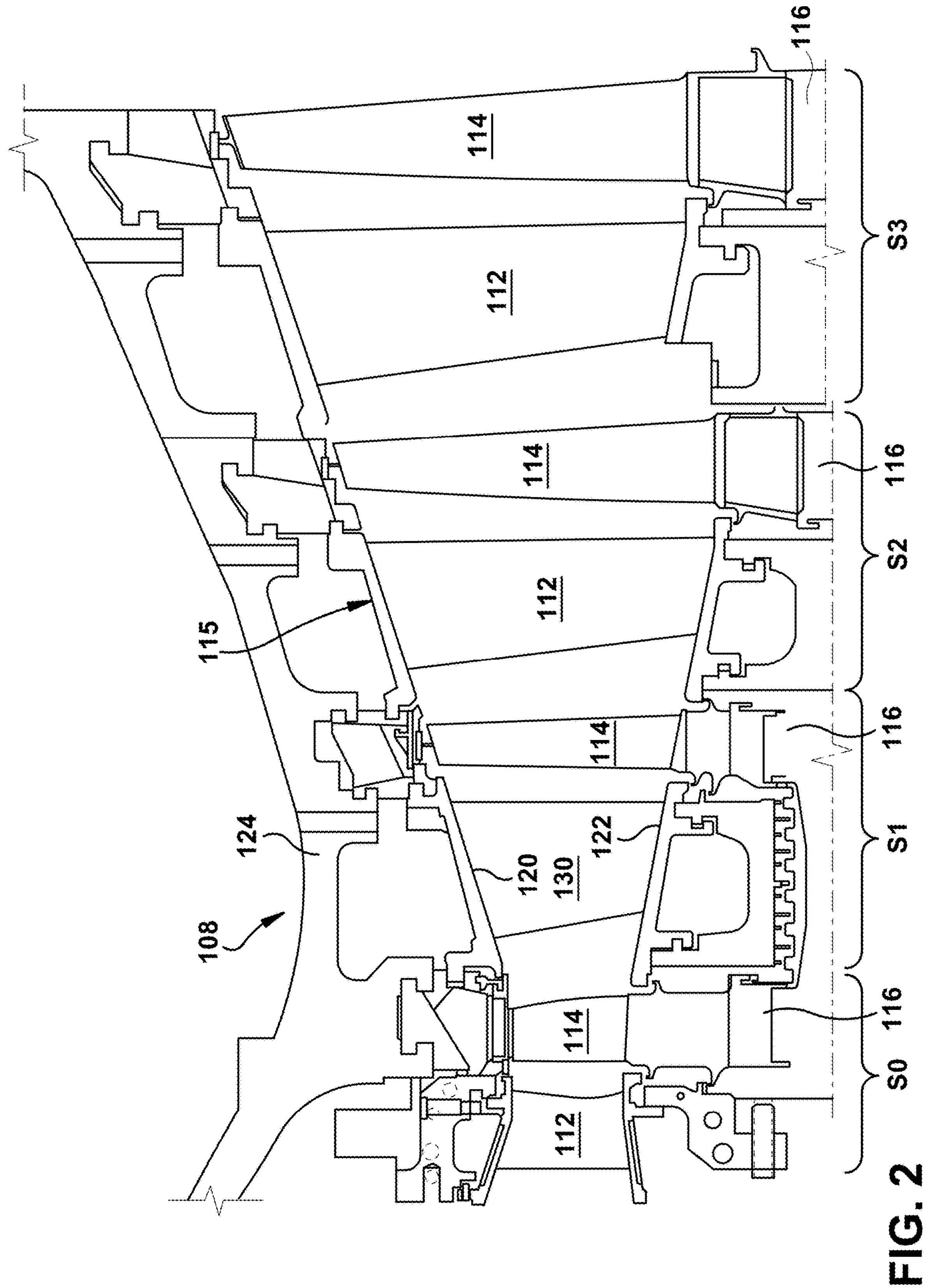
FIG. 2 shows a cross-sectional view of an illustrative turbine section with four stages that may be used with the turbomachine in FIG. 1.

FIG. 2 shows a cross-section view of an illustrative non-limiting portion of turbine section 108 with four stages S0-S3 that may be used with GT system 100 in FIG. 1. The four stages are referred to as S0, S1, S2, and S3. Stage S0 is the first stage and is the smallest (in a radial direction) of the four stages. Stage S1 is the second stage and is the next stage in an axial direction. Stage S2 is the third stage and is the next stage in an axial direction. Stage S3 is the fourth, last stage and is the largest (in a radial direction). It is to be understood that four stages are shown as one non-limiting example only, and each turbine may have more or less than four stages.

A set of stationary vanes or nozzles 112 cooperate with a set of turbine rotor blades 114 to form each stage S0-S3 of turbine section 108 and to define a portion of a flow path through turbine section 108. Turbine rotor blades 114 in each set are coupled to a respective rotor wheel 116 that couples them circumferentially to rotor shaft 110 (FIG. 1). That is, a plurality of turbine rotor blades 114 are mechanically coupled in a circumferentially spaced manner to each rotor wheel 116 (FIG. 2). A static blade section 115 includes stationary nozzles 112 circumferentially spaced around rotor shaft 110. Each nozzle 112 may include at least one endwall (or platform) 120, 122 connected with airfoil 130. In the example shown in FIG. 2, nozzle 112 includes a radially outer endwall 120 and a radially inner endwall 122. Radially outer endwall 120 couples nozzle 112 to a casing 124 of turbine section 108.

In operation, air flows through compressor section 102, and compressed air is supplied to combustion section 104. Specifically, the compressed air is supplied to fuel nozzle assembly 106 that is integral to combustion section 104. Fuel nozzle assembly 106 is in flow communication with combustion regions of combustors 105. Fuel nozzle assembly 106 is also in flow communication with a fuel source (not shown in FIG. 1) and channels fuel and air to combustors 105. Combustion section 104 ignites and combusts fuel to produce high temperature combustion products. Combustion section 104 is in flow communication with turbine section 108 within which the gas stream thermal energy of the combustion products is converted to mechanical rotational energy. Turbine section 108 is rotatably coupled to and drives rotor shaft 110. Compressor section 102 may also be rotatably coupled with rotor shaft 110. In the illustrative embodiment, combustion section 104 includes a plurality of combustors 105 and fuel nozzle assemblies 106. At least one end of rotating rotor shaft 110 may extend axially away from turbine section 108 (or compressor section 102) and may be attached to a load or machinery (not shown), such as, but not limited to, a generator, a load compressor, and/or another turbine.

Figure 3:
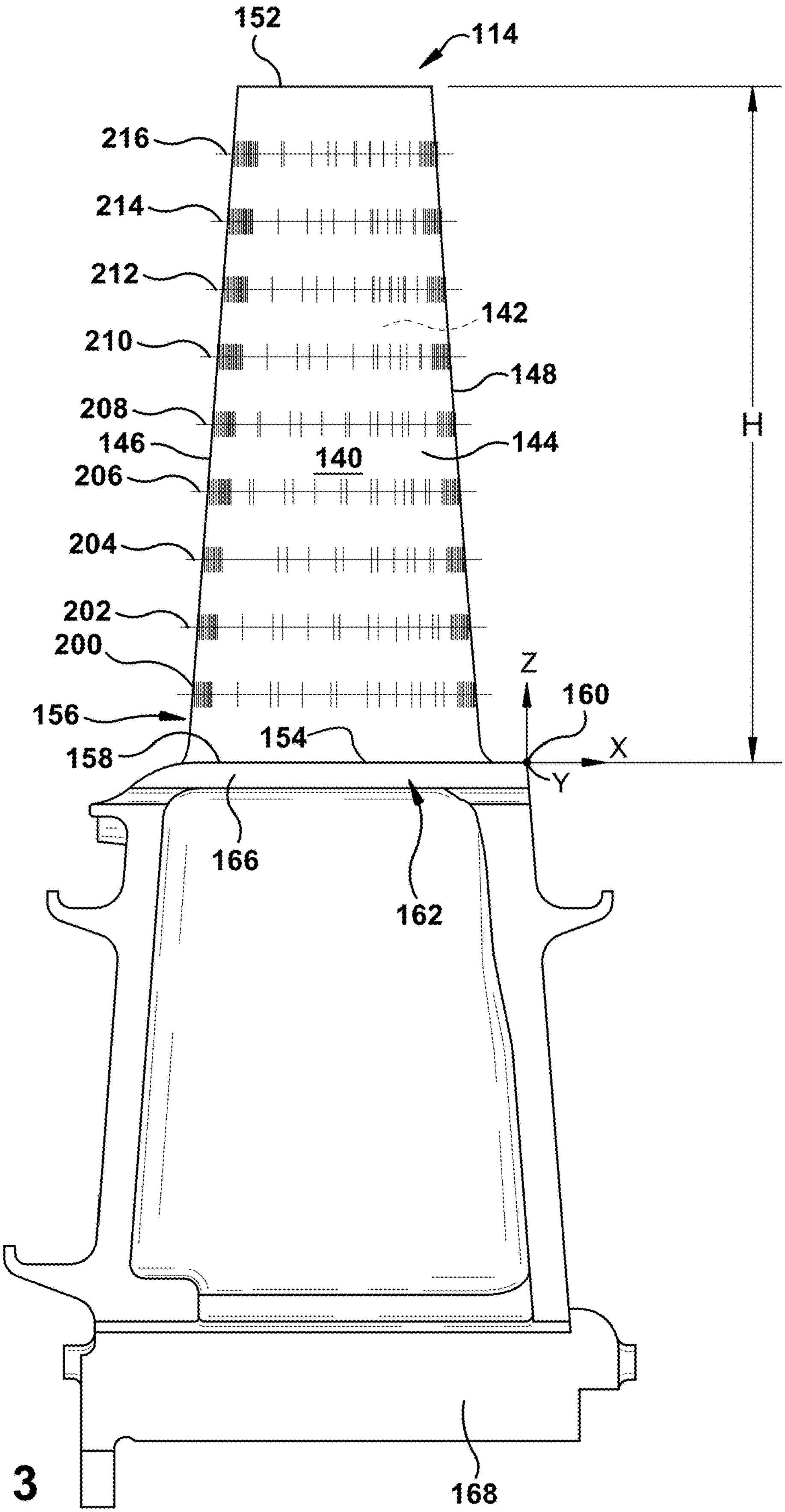
FIG. 3 shows a schematic side view of an illustrative turbine rotor blade, according to various embodiments of the disclosure.
Figure 4:
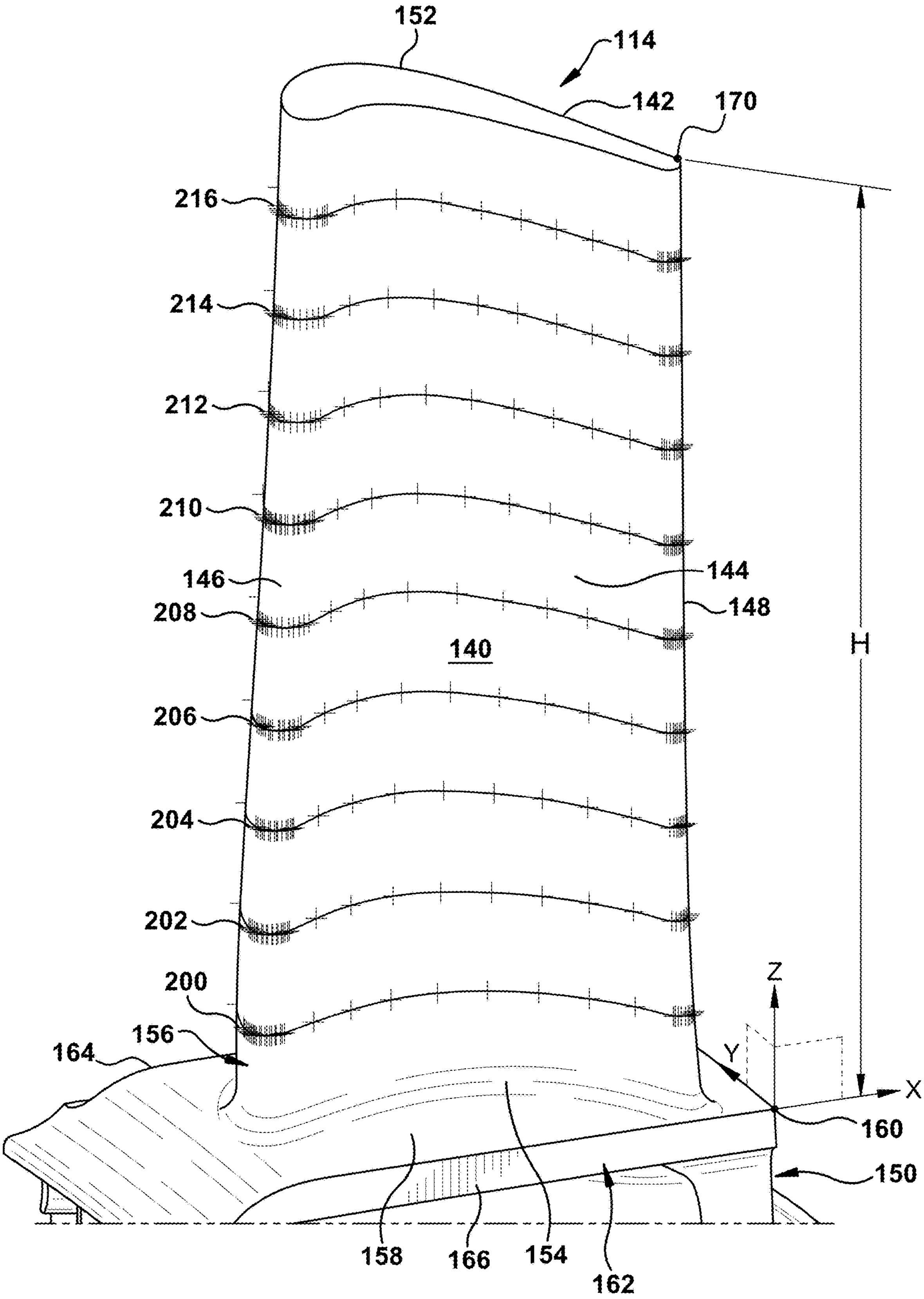
FIG. 4 shows a schematic front perspective view of an illustrative turbine rotor blade, according to various embodiments of the disclosure.
Figure 5:
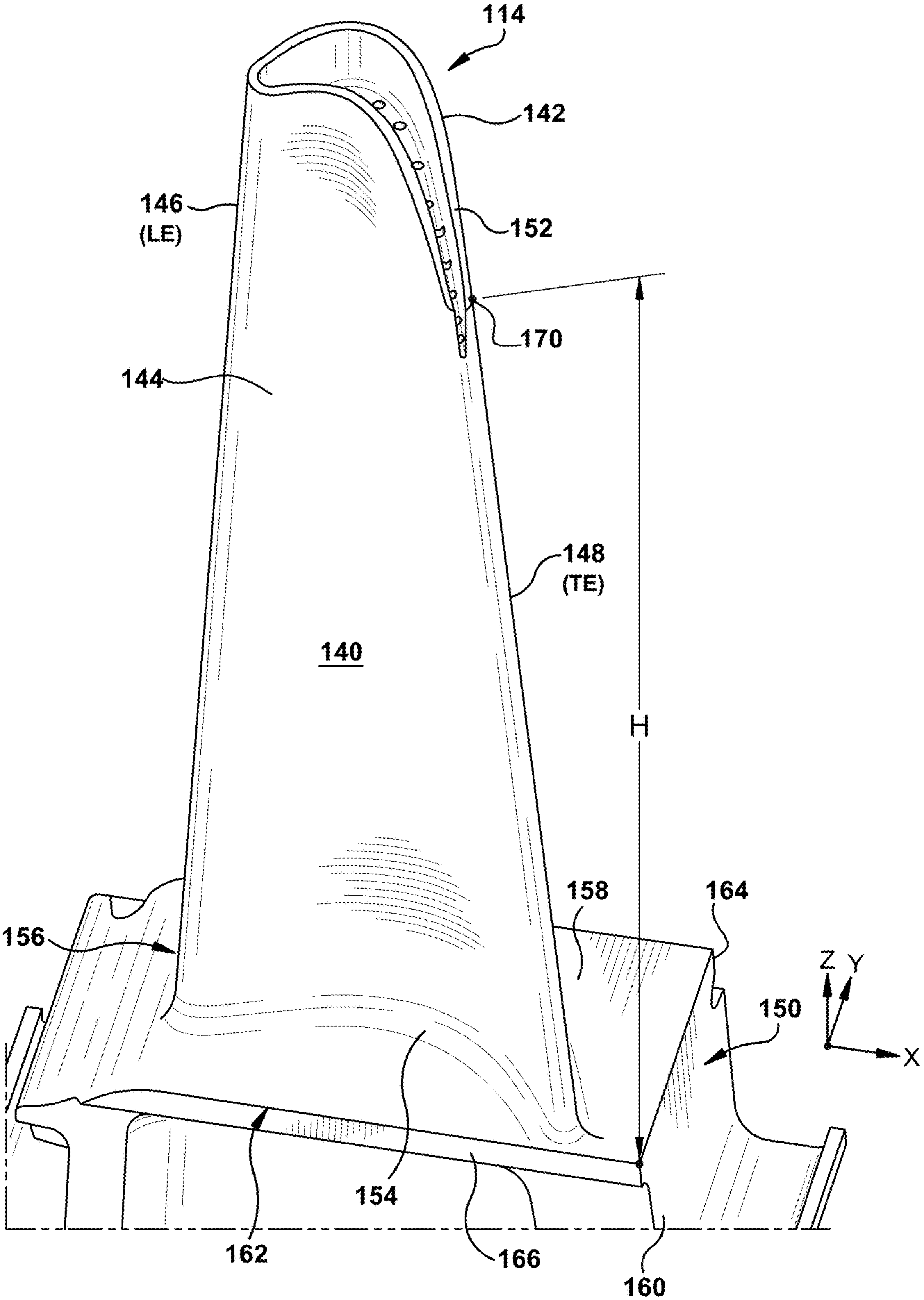
FIG. 5 shows a schematic rear perspective view of an illustrative turbine rotor blade, according to various embodiments of the disclosure.

FIG. 3 shows a schematic side view of an illustrative turbine rotor blade; FIG. 4 shows a schematic front perspective view of an illustrative turbine rotor blade; and FIG. 5 shows a schematic rear perspective view of the illustrative turbine rotor blade, according to various embodiments of the disclosure. Turbine rotor blade 114 (sometimes referred to herein as "blade 114" for brevity) is a rotatable (dynamic) blade, which is part of a stage or set of turbine rotor blades 114 (FIG. 2) circumferentially dispersed about a rotor shaft 110 in a stage of a turbine section 108 (FIG. 2). That is, during operation of turbine 108, as a working fluid (e.g., gas or steam) is directed across the blade's airfoil, blade 114 will initiate rotation of rotor shaft 110 and rotate about an axis defined by rotor shaft 110. An axis of rotor shaft 110 is parallel to axis X in the legends used in the drawings. It is understood that blade 114 may be configured to couple (mechanically couple via fasteners, welds, slot/grooves, etc.) with a plurality of similar or distinct blades 114 (e.g., blades 114 or other blades) to form a set of blades in a stage of turbine section 108 (e.g., a first stage S0 in FIG. 2).

With reference to FIGS. 3-5, turbine rotor blade 114 can include an airfoil 140 having a suction side 142 (obstructed in this view) and a pressure side 144 opposing suction side 142. Blade 114 can also include a leading edge 146 spanning between pressure side 144 and suction side 142, and a trailing edge 148 opposing leading edge 146 and spanning between pressure side 144 and suction side 142.

As shown, blade 114 can also include an endwall 150 connected with airfoil 140 and a tip end 152 on the opposite end of airfoil 140. In FIGS. 3-5, tip end 152 is shown without a tip shroud; however, a tip shroud may be applied if desired. Endwall 150 can have a platform 162 from which airfoil 140 extends and a shank 168 with any suitable configuration to connect to rotor shaft 110. Endwall 150 can be connected with airfoil 140 along suction side 142, pressure side 144, leading edge 146 and trailing edge 148. In various embodiments, blade 114 includes a fillet 154 proximate a first end 156 of airfoil 140, fillet 154 connecting airfoil 140 and endwall 150 (e.g., at a top surface 158 of endwall 150). Fillet 154 can include a weld or braze fillet, which may be formed via conventional MIG welding, TIG welding, brazing, etc. Endwall 150 is configured to fit into a mating slot in a rotor wheel 116 (FIG. 2) coupled to rotor shaft 110 (FIG. 1) and perhaps mate with adjacent components of other blades 114. The endwall 150 is intended to be located radially inboard of airfoil 140 and can include shank 168 formed in any complementary configuration to rotor wheel 116 (FIG. 2) and/or rotor shaft 110 (FIG. 1). Endwall 150 (i.e., platform 162) may include a pressure side, aftmost point 160 that functions as an origin for defining a profile of airfoil 140 according to embodiments of the disclosure. That is, airfoil 140 has a shape having a nominal profile substantially in accordance with Cartesian coordinate values of X, Y and Z set forth in TABLE I and originating at the origin (i.e., point 160).

With reference again to FIGS. 2 and 3, in various non-limiting embodiments, blade 114 can include a first stage (S0) blade, a second stage (S1) blade, a third stage (S2) blade, or a fourth stage (S3) blade. In particular embodiments, blade 114 includes a first stage (S0) blade. In various embodiments, turbine section 108 can include a set of blades 114 in only the first stage (S0) of turbine section 108, or in only second stage (S3), or in only third stage (S2), or in only fourth stage (S3) of turbine section 108.

With continuing reference to FIGS. 3-5, in various embodiments, airfoil 140 may have an airfoil shape to fit airfoil 140 on a straight platform 162 of endwall 150. A straight platform 162 refers to platform 162 having a suction side edge 164 (FIGS. 4, 5) and a pressure side edge 166 that are aligned with an axis X of endwall 150, shown in a non-limiting configuration in FIG. 3 as being coupled to shank 168 in the form of a dovetail.

Figure 6B:
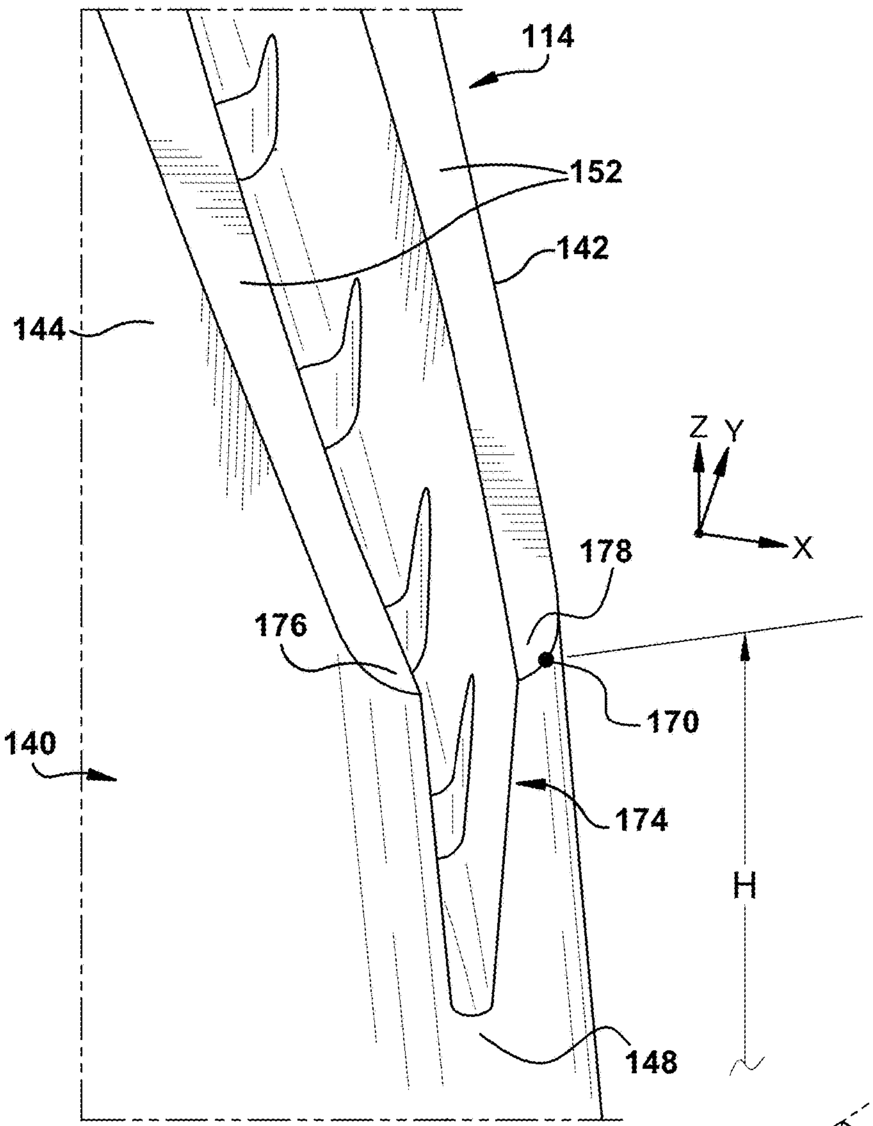
FIG. 6B shows a schematic three-dimensional view of a trailing edge of an illustrative turbine rotor blade, according to other embodiments of the disclosure.
Figure 6A:
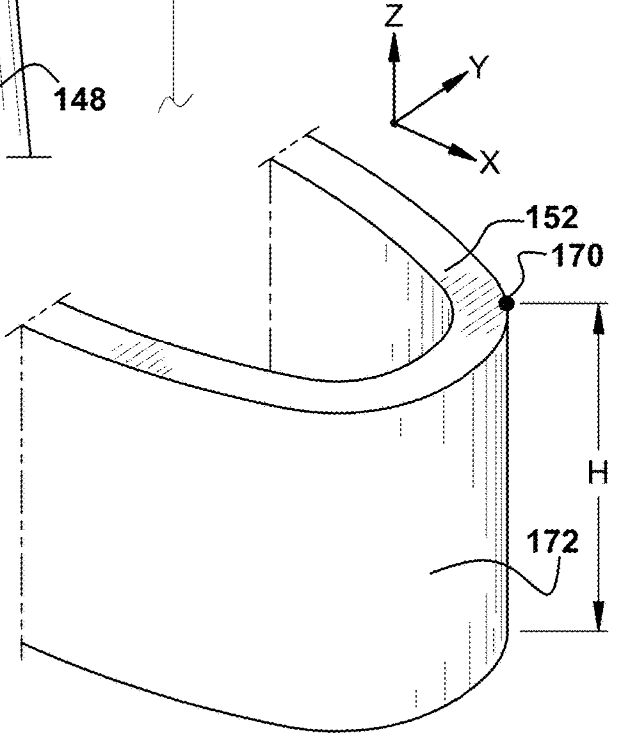
FIG. 6A shows a schematic three-dimensional view of a trailing edge of an illustrative turbine rotor blade, according to embodiments of the disclosure.

With reference to FIGS. 3-6B, airfoil 140 may have a height H defined radially between a pressure side, aftmost point 160, i.e., also referenced as origin 160, of endwall 150 and a radial location of an aftmost point 170 of trailing edge 148. Aftmost point 170 of trailing edge 148 is defined as the point at tip end 152 that is farthest aft on trailing edge 148. In many cases, as shown in FIG. 6A, aftmost point 170 of trailing edge 148 may be the point farthest aft on a continuous curved surface 172 of trailing edge 148. In some cases, as shown in FIG. 6B, where trailing edge 148 includes a split end 174 at tip end 152 having a pressure side portion 176 and a suction side portion 178, aftmost point 170 of trailing edge 148 is identifiable as the point that is farthest aft on either portion 176, 178 on trailing edge 148. In the example in FIG. 6B, aftmost point 170 is on pressure side portion 176; however, in some cases, aftmost point 170 may alternatively be on suction side portion 178.

With reference to FIGS. 3 and 4, a plurality of cross sections 200, 202, 204, 206, 208, 210, 212, 214, 216 (sometimes referenced as "200-216" for brevity) along height H correspond to Z coordinate values of chord lines, and each cross section 200-216 of airfoil 140 can be described by a respective set of X and Y coordinates. For example, 38 points can be listed to define each cross section 200-216, though it should be apparent that more or fewer points can be used for the respective sides of each cross section, and more or fewer cross sections can be used, as may be desired and/or appropriate.

Figure 7:
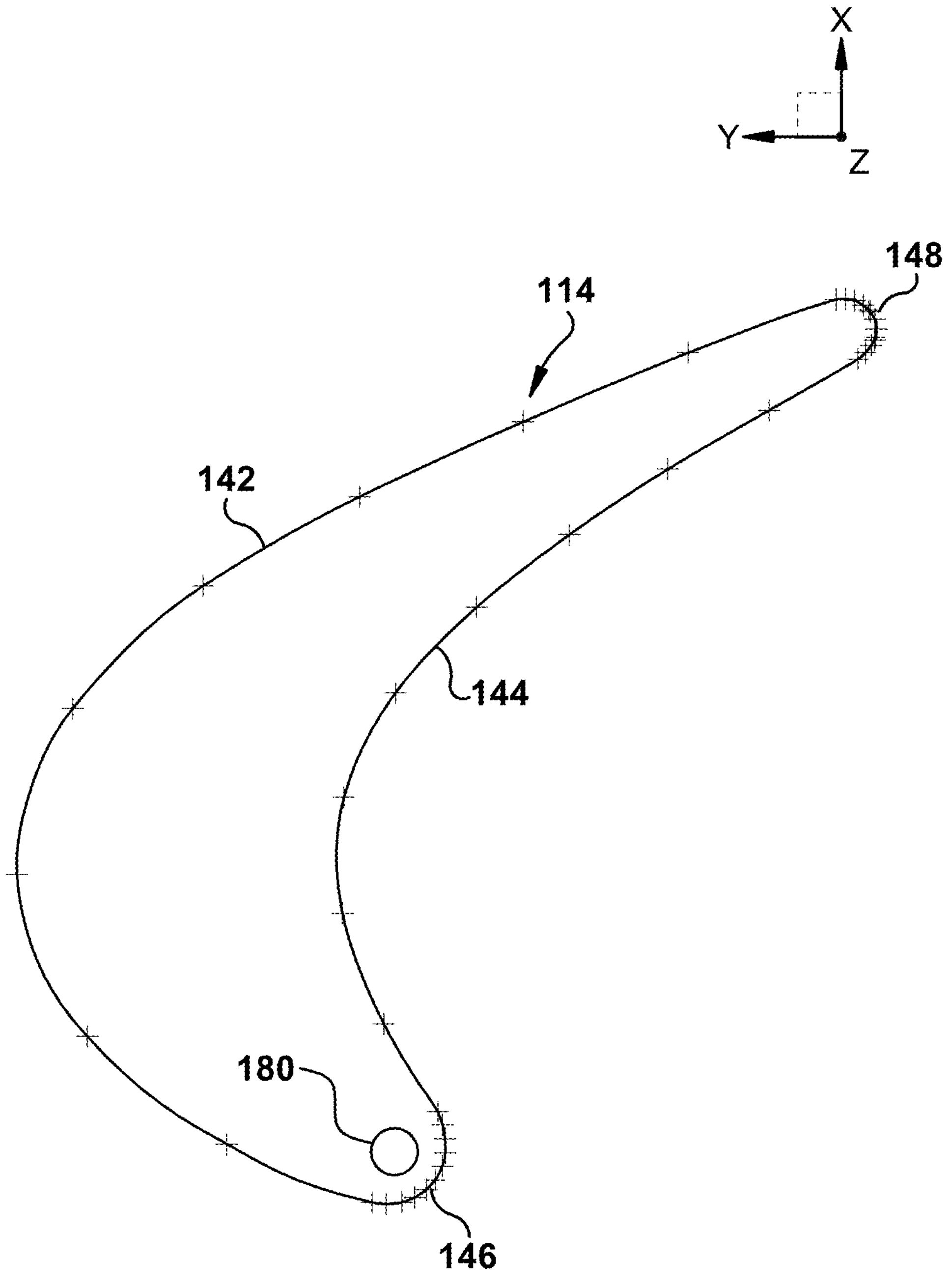
FIG. 7 shows a schematic top-down view of one layer of data points for the turbine rotor blade, according to various embodiments of the disclosure.
Figure 8:
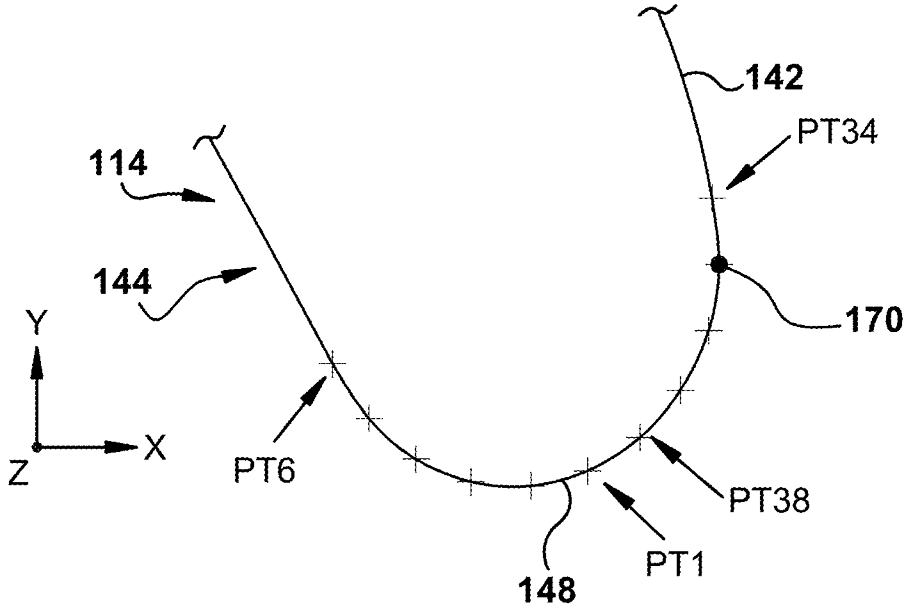
FIG. 8 shows a schematic top-down view of one layer of data points at a trailing edge of the turbine rotor blade, according to various embodiments of the disclosure.
Figure 9:
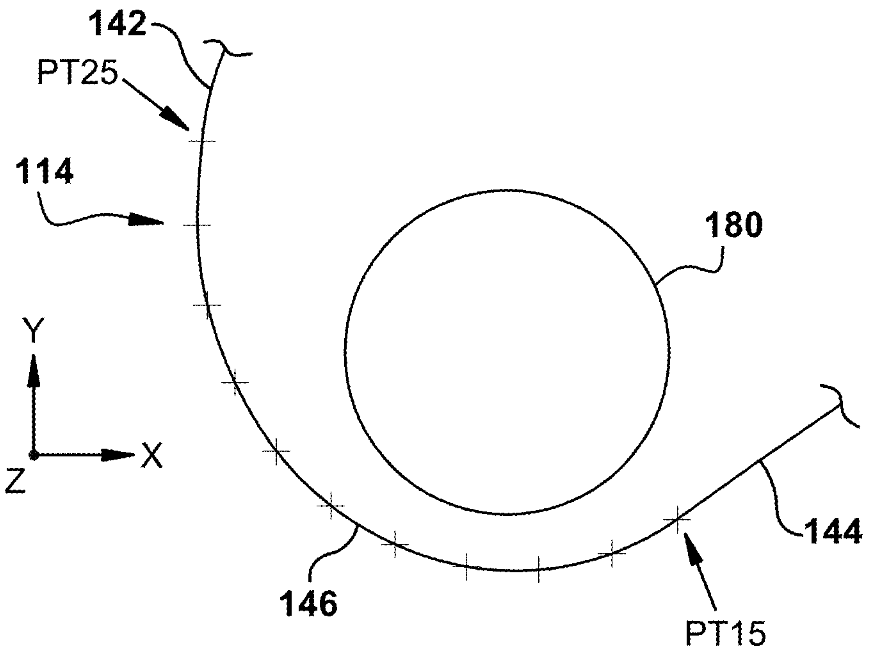
FIG. 9 shows a schematic top-down view of one layer of data points at a leading edge of the turbine rotor blade, according to various embodiments of the disclosure.

FIG. 7 illustrates a schematic top-down view of one layer of data points (i.e., one cross section) for airfoil 140 of turbine rotor blade 114, according to various embodiments of the disclosure. Similarly, FIG. 8 shows a schematic top-down view of one layer of data points (partial cross section) at a trailing edge 148 of airfoil 140 of turbine rotor blade 114, and FIG. 9 shows a schematic top-down view of one layer of data points (partial cross section) at a leading edge 146 of airfoil 140 of turbine rotor blade 114, according to various embodiments of the disclosure. As shown in FIGS. 7 and 9, a cooling passage 180 may extend radially within airfoil 140 at leading edge 146. The geometry of leading edge 146 facilitates the placement of cooling passage 180 in proximity to the internal surface of leading edge 146, thereby resulting in considerable decrease of local temperatures and subsequently a substantial increase in part life and reduced outages for repair.

Although not necessary in all cases, data points from TABLE I can be clustered at or near trailing edge 148 and/or leading edge 146 to provide more precise definition in those locations. That is, more data points can be provided to more precisely define, e.g., with more granularity, certain surface profile locations of airfoil 140. For example, as shown in FIG. 8, trailing edge 148 may be defined by data points PT1-PT6 and PT34-PT38 from TABLE I; and as shown in FIG. 9, leading edge 146 may be defined by data points PT15-PT25.

The X, Y, and Z coordinate values in TABLE I have been expressed in normalized or non-dimensionalized form in values of from 0 to 1 (percentages), but it should be apparent that any or all of the coordinate values could instead be expressed in distance units so long as the percentages and proportions are maintained. To convert an X, Y or Z value of TABLE I to a respective X, Y or Z coordinate value in units of distance, such as inches or centimeters, the non-dimensional X, Y or Z value given in TABLE I can be multiplied by height H of airfoil 140 in such units of distance. By connecting the X and Y values with smooth continuing arcs, each profile cross section at each distance Z can be fixed, and the airfoil profiles of the various surface locations between the distances Z can be determined by smoothly connecting adjacent profile sections to one another, thus forming the nominal airfoil profile. That is, the X, Y, Z data points may be joined smoothly with one another (with lines and/or arcs) to form a surface profile for airfoil 140 (e.g., suction side 142, pressure side 144, leading edge 146 and/or trailing edge 148) using any now known or later developed curve fitting technique generating a curved surface appropriate for an airfoil. Curve fitting techniques may include but are not limited to: extrapolation, interpolation, smoothing, polynomial regression, and/or other mathematical curve fitting functions. The curve fitting technique may be performed manually and/or computationally, e.g., through statistical and/or numerical-analysis software.

The values in TABLE I are non-dimensionalized percentages generated and shown to three decimal places for determining the nominal profile of an airfoil 140 at ambient, non-operating, or non-hot conditions, and do not take any coatings or fillets into account, though embodiments could account for other conditions, coatings, and/or fillets. To allow for typical manufacturing tolerances and/or coating thicknesses, +/− values can be added to the values listed in TABLE I, particularly to the X and Y values therein. For example, a tolerance of about 10-20 percent of a thickness of trailing edge 148 in a direction normal to any surface location along the airfoil profile can define an airfoil profile envelope for a blade airfoil design at cold or room temperature. In other words, a distance of about 10-20 percent of a thickness of trailing edge 148 in a direction normal to any surface location along the airfoil profile can define a range of variation between measured points on an actual airfoil surface and ideal positions of those points, particularly at a cold or room temperature, as embodied by the disclosure. Airfoil 140 configuration, as embodied herein, is robust to this range of variation without impairment of mechanical and aerodynamic functions.

Likewise, the profile and/or configuration can be scaled up or down, such as geometrically, without impairment of operation. Such scaling can be facilitated by multiplying the normalized/non-dimensionalized percentage values by a common scaling factor, which may be a larger or smaller number of distance units than might have originally been used for a blade of a given height. For example, the non-dimensionalized percentage values in TABLE I, particularly the X and Y values, could be multiplied uniformly by a scaling factor of 2, 0.5, or any other desired scaling factor. In various embodiments, the X, Y, and Z distances are scalable as a function of the same constant or number to provide a scaled up or scaled down airfoil 140. Alternatively, the values could be multiplied by a larger or smaller desired height. As referenced herein, the origin of the X, Y, Z coordinate system is a pressure side, aftmost point 160 of platform 162 (FIGS. 3-5).

While the Cartesian values in TABLE I provide Z coordinate values at increments between 0% and 100% (0.0 to 1.0), only a portion of Cartesian coordinate values set forth in TABLE I may be employed. In one non-limiting example, with reference to FIG. 4, the airfoil profile sections may use Z coordinate values defined within approximately 10% and 92% of the height of the airfoil, i.e., from cross sections 200-216 (FIGS. 3-4). More particularly, Z values may be at roughly 10% intervals. For example, cross-section 200 is at 10.4% (0.104), cross-section 202 is at 20.7% (0.207), cross-section 204 is at 30.9% (0.309), cross-section 206 is at 41.1% (0.411), cross-section 208 is at 51.4% (0.514), cross-section 210 is at 61.6% (0.616), cross-section 212 is at 71.8% (0.718), cross-section 214 is at 82.0% (0.820), and cross-section 216 is 92.3% (0.923). However, any portion of Cartesian coordinate values of X, Y and Z set forth in TABLE I may be employed, e.g., from 15%-85%, 20% to 30%, 37%-50%, etc., to define a portion of airfoil 140.

Where a Z value is used that is not expressly listed in TABLE I, the corresponding X and Y values can be identified through extrapolation. For example, if a Z layer is required at 37%, then the X value at 30% plus 0.7 times (70% of) the difference between the X value at 30% and 40%, can be used. Similarly, the Y value at 30% plus 0.7 times (70% of) the difference between the Y value at 30% and 40%, can be used. Other extrapolation processes can also be employed. Such extrapolation may also be used to define points in the planes outside the data listed, such as at 5% and 95% of height H of airfoil 140.

TABLE I

[non-dimensionalized percentages]

| Point | X | Y | Z |
|---|---|---|---|
| 1 | −0.085 | 0.002 | 0.104 |
| 2 | −0.089 | 0.000 | 0.104 |

TABLE I-continued

[non-dimensionalized percentages]

| Point | X | Y | Z |
|---|---|---|---|
| 3 | −0.092 | 0.000 | 0.104 |
| 4 | −0.096 | 0.001 | 0.104 |
| 5 | −0.099 | 0.003 | 0.104 |
| 6 | −0.102 | 0.006 | 0.104 |
| 7 | −0.127 | 0.042 | 0.104 |
| 8 | −0.159 | 0.081 | 0.104 |
| 9 | −0.197 | 0.114 | 0.104 |
| 10 | −0.241 | 0.138 | 0.104 |
| 11 | −0.289 | 0.152 | 0.104 |
| 12 | −0.339 | 0.153 | 0.104 |
| 13 | −0.388 | 0.144 | 0.104 |
| 14 | −0.436 | 0.128 | 0.104 |
| 15 | −0.476 | 0.110 | 0.104 |
| 16 | −0.481 | 0.109 | 0.104 |
| 17 | −0.486 | 0.108 | 0.104 |
| 18 | −0.491 | 0.109 | 0.104 |
| 19 | −0.496 | 0.110 | 0.104 |
| 20 | −0.500 | 0.113 | 0.104 |
| 21 | −0.504 | 0.116 | 0.104 |
| 22 | −0.506 | 0.121 | 0.104 |
| 23 | −0.507 | 0.126 | 0.104 |
| 24 | −0.507 | 0.131 | 0.104 |
| 25 | −0.506 | 0.136 | 0.104 |
| 26 | −0.484 | 0.201 | 0.104 |
| 27 | −0.437 | 0.265 | 0.104 |
| 28 | −0.373 | 0.310 | 0.104 |
| 29 | −0.295 | 0.318 | 0.104 |
| 30 | −0.224 | 0.285 | 0.104 |
| 31 | −0.173 | 0.225 | 0.104 |
| 32 | −0.137 | 0.155 | 0.104 |
| 33 | −0.105 | 0.082 | 0.104 |
| 34 | −0.079 | 0.018 | 0.104 |
| 35 | −0.078 | 0.014 | 0.104 |
| 36 | −0.078 | 0.010 | 0.104 |
| 37 | −0.080 | 0.007 | 0.104 |
| 38 | −0.082 | 0.004 | 0.104 |
| 1 | −0.094 | −0.004 | 0.207 |
| 2 | −0.097 | −0.005 | 0.207 |
| 3 | −0.100 | −0.005 | 0.207 |
| 4 | −0.104 | −0.005 | 0.207 |
| 5 | −0.107 | −0.003 | 0.207 |
| 6 | −0.109 | −0.001 | 0.207 |
| 7 | −0.134 | 0.035 | 0.207 |
| 8 | −0.164 | 0.075 | 0.207 |
| 9 | −0.198 | 0.111 | 0.207 |
| 10 | −0.238 | 0.141 | 0.207 |
| 11 | −0.284 | 0.161 | 0.207 |
| 12 | −0.333 | 0.167 | 0.207 |
| 13 | −0.382 | 0.159 | 0.207 |
| 14 | −0.429 | 0.142 | 0.207 |
| 15 | −0.468 | 0.121 | 0.207 |
| 16 | −0.472 | 0.120 | 0.207 |
| 17 | −0.477 | 0.119 | 0.207 |
| 18 | −0.482 | 0.119 | 0.207 |
| 19 | −0.487 | 0.120 | 0.207 |
| 20 | −0.492 | 0.122 | 0.207 |
| 21 | −0.495 | 0.125 | 0.207 |
| 22 | −0.497 | 0.130 | 0.207 |
| 23 | −0.498 | 0.135 | 0.207 |
| 24 | −0.499 | 0.140 | 0.207 |
| 25 | −0.499 | 0.145 | 0.207 |
| 26 | −0.478 | 0.209 | 0.207 |
| 27 | −0.433 | 0.273 | 0.207 |
| 28 | −0.368 | 0.315 | 0.207 |
| 29 | −0.291 | 0.317 | 0.207 |
| 30 | −0.225 | 0.278 | 0.207 |
| 31 | −0.178 | 0.216 | 0.207 |
| 32 | −0.142 | 0.146 | 0.207 |
| 33 | −0.111 | 0.074 | 0.207 |
| 34 | −0.087 | 0.010 | 0.207 |
| 35 | −0.087 | 0.007 | 0.207 |
| 36 | −0.087 | 0.004 | 0.207 |
| 37 | −0.089 | 0.001 | 0.207 |
| 38 | −0.091 | −0.002 | 0.207 |
| 1 | −0.101 | −0.011 | 0.309 |
| 2 | −0.104 | −0.012 | 0.309 |

TABLE I-continued

[non-dimensionalized percentages]

| Point | X | Y | Z |
|---|---|---|---|
| 3 | −0.108 | −0.012 | 0.309 |
| 4 | −0.111 | −0.011 | 0.309 |
| 5 | −0.114 | −0.010 | 0.309 |
| 6 | −0.117 | −0.007 | 0.309 |
| 7 | −0.140 | 0.030 | 0.309 |
| 8 | −0.168 | 0.071 | 0.309 |
| 9 | −0.200 | 0.109 | 0.309 |
| 10 | −0.236 | 0.143 | 0.309 |
| 11 | −0.279 | 0.168 | 0.309 |
| 12 | −0.328 | 0.179 | 0.309 |
| 13 | −0.377 | 0.172 | 0.309 |
| 14 | −0.423 | 0.153 | 0.309 |
| 15 | −0.460 | 0.132 | 0.309 |
| 16 | −0.465 | 0.130 | 0.309 |
| 17 | −0.469 | 0.130 | 0.309 |
| 18 | −0.473 | 0.130 | 0.309 |
| 19 | −0.478 | 0.131 | 0.309 |
| 20 | −0.482 | 0.133 | 0.309 |
| 21 | −0.485 | 0.136 | 0.309 |
| 22 | −0.488 | 0.139 | 0.309 |
| 23 | −0.490 | 0.143 | 0.309 |
| 24 | −0.491 | 0.147 | 0.309 |
| 25 | −0.491 | 0.152 | 0.309 |
| 26 | −0.472 | 0.216 | 0.309 |
| 27 | −0.429 | 0.279 | 0.309 |
| 28 | −0.364 | 0.318 | 0.309 |
| 29 | −0.288 | 0.314 | 0.309 |
| 30 | −0.226 | 0.270 | 0.309 |
| 31 | −0.183 | 0.206 | 0.309 |
| 32 | −0.149 | 0.138 | 0.309 |
| 33 | −0.118 | 0.067 | 0.309 |
| 34 | −0.094 | 0.004 | 0.309 |
| 35 | −0.094 | 0.001 | 0.309 |
| 36 | −0.094 | −0.003 | 0.309 |
| 37 | −0.096 | −0.006 | 0.309 |
| 38 | −0.098 | −0.009 | 0.309 |
| 1 | −0.109 | −0.017 | 0.412 |
| 2 | −0.112 | −0.018 | 0.412 |
| 3 | −0.115 | −0.018 | 0.412 |
| 4 | −0.119 | −0.017 | 0.412 |
| 5 | −0.122 | −0.016 | 0.412 |
| 6 | −0.124 | −0.013 | 0.412 |
| 7 | −0.147 | 0.023 | 0.412 |
| 8 | −0.173 | 0.065 | 0.412 |
| 9 | −0.201 | 0.104 | 0.412 |
| 10 | −0.234 | 0.141 | 0.412 |
| 11 | −0.273 | 0.171 | 0.412 |
| 12 | −0.319 | 0.187 | 0.412 |
| 13 | −0.367 | 0.183 | 0.412 |
| 14 | −0.413 | 0.165 | 0.412 |
| 15 | −0.449 | 0.143 | 0.412 |
| 16 | −0.454 | 0.141 | 0.412 |
| 17 | −0.459 | 0.140 | 0.412 |
| 18 | −0.464 | 0.140 | 0.412 |
| 19 | −0.469 | 0.141 | 0.412 |
| 20 | −0.473 | 0.143 | 0.412 |
| 21 | −0.477 | 0.147 | 0.412 |
| 22 | −0.480 | 0.151 | 0.412 |
| 23 | −0.483 | 0.155 | 0.412 |
| 24 | −0.484 | 0.160 | 0.412 |
| 25 | −0.484 | 0.165 | 0.412 |
| 26 | −0.463 | 0.227 | 0.412 |
| 27 | −0.419 | 0.287 | 0.412 |
| 28 | −0.354 | 0.321 | 0.412 |
| 29 | −0.281 | 0.308 | 0.412 |
| 30 | −0.226 | 0.259 | 0.412 |
| 31 | −0.186 | 0.196 | 0.412 |
| 32 | −0.154 | 0.128 | 0.412 |
| 33 | −0.125 | 0.059 | 0.412 |
| 34 | −0.102 | −0.002 | 0.412 |
| 35 | −0.102 | −0.006 | 0.412 |
| 36 | −0.102 | −0.009 | 0.412 |
| 37 | −0.103 | −0.012 | 0.412 |
| 38 | −0.106 | −0.015 | 0.412 |
| 1 | −0.117 | −0.024 | 0.514 |
| 2 | −0.121 | −0.024 | 0.514 |

TABLE I-continued

[non-dimensionalized percentages]

| Point | X | Y | Z |
|---|---|---|---|
| 3 | −0.124 | −0.024 | 0.514 |
| 4 | −0.128 | −0.023 | 0.514 |
| 5 | −0.131 | −0.021 | 0.514 |
| 6 | −0.133 | −0.018 | 0.514 |
| 7 | −0.154 | 0.018 | 0.514 |
| 8 | −0.178 | 0.060 | 0.514 |
| 9 | −0.204 | 0.100 | 0.514 |
| 10 | −0.234 | 0.137 | 0.514 |
| 11 | −0.269 | 0.170 | 0.514 |
| 12 | −0.311 | 0.191 | 0.514 |
| 13 | −0.358 | 0.192 | 0.514 |
| 14 | −0.403 | 0.175 | 0.514 |
| 15 | −0.439 | 0.153 | 0.514 |
| 16 | −0.444 | 0.151 | 0.514 |
| 17 | −0.449 | 0.150 | 0.514 |
| 18 | −0.455 | 0.150 | 0.514 |
| 19 | −0.461 | 0.151 | 0.514 |
| 20 | −0.466 | 0.154 | 0.514 |
| 21 | −0.470 | 0.158 | 0.514 |
| 22 | −0.473 | 0.163 | 0.514 |
| 23 | −0.475 | 0.168 | 0.514 |
| 24 | −0.476 | 0.173 | 0.514 |
| 25 | −0.476 | 0.179 | 0.514 |
| 26 | −0.452 | 0.238 | 0.514 |
| 27 | −0.408 | 0.295 | 0.514 |
| 28 | −0.342 | 0.323 | 0.514 |
| 29 | −0.275 | 0.301 | 0.514 |
| 30 | −0.225 | 0.248 | 0.514 |
| 31 | −0.189 | 0.185 | 0.514 |
| 32 | −0.159 | 0.119 | 0.514 |
| 33 | −0.131 | 0.051 | 0.514 |
| 34 | −0.109 | −0.009 | 0.514 |
| 35 | −0.109 | −0.012 | 0.514 |
| 36 | −0.110 | −0.016 | 0.514 |
| 37 | −0.111 | −0.019 | 0.514 |
| 38 | −0.114 | −0.022 | 0.514 |
| 1 | −0.124 | −0.032 | 0.617 |
| 2 | −0.127 | −0.032 | 0.617 |
| 3 | −0.131 | −0.032 | 0.617 |
| 4 | −0.134 | −0.031 | 0.617 |
| 5 | −0.137 | −0.029 | 0.617 |
| 6 | −0.139 | −0.026 | 0.617 |
| 7 | −0.159 | 0.010 | 0.617 |
| 8 | −0.181 | 0.052 | 0.617 |
| 9 | −0.205 | 0.092 | 0.617 |
| 10 | −0.232 | 0.131 | 0.617 |
| 11 | −0.263 | 0.166 | 0.617 |
| 12 | −0.302 | 0.192 | 0.617 |
| 13 | −0.348 | 0.199 | 0.617 |
| 14 | −0.393 | 0.185 | 0.617 |
| 15 | −0.428 | 0.165 | 0.617 |
| 16 | −0.434 | 0.162 | 0.617 |
| 17 | −0.440 | 0.161 | 0.617 |
| 18 | −0.446 | 0.161 | 0.617 |
| 19 | −0.452 | 0.163 | 0.617 |
| 20 | −0.458 | 0.166 | 0.617 |
| 21 | −0.462 | 0.170 | 0.617 |
| 22 | −0.465 | 0.175 | 0.617 |
| 23 | −0.467 | 0.181 | 0.617 |
| 24 | −0.468 | 0.188 | 0.617 |
| 25 | −0.467 | 0.194 | 0.617 |
| 26 | −0.442 | 0.250 | 0.617 |
| 27 | −0.396 | 0.303 | 0.617 |
| 28 | −0.330 | 0.322 | 0.617 |
| 29 | −0.268 | 0.290 | 0.617 |
| 30 | −0.224 | 0.235 | 0.617 |
| 31 | −0.191 | 0.172 | 0.617 |
| 32 | −0.163 | 0.108 | 0.617 |
| 33 | −0.137 | 0.042 | 0.617 |
| 34 | −0.116 | −0.017 | 0.617 |
| 35 | −0.116 | −0.020 | 0.617 |
| 36 | −0.116 | −0.024 | 0.617 |
| 37 | −0.118 | −0.027 | 0.617 |
| 38 | −0.120 | −0.030 | 0.617 |
| 1 | −0.130 | −0.040 | 0.719 |
| 2 | −0.134 | −0.041 | 0.719 |

TABLE I-continued

[non-dimensionalized percentages]

| Point | X | Y | Z |
|---|---|---|---|
| 3 | −0.138 | −0.041 | 0.719 |
| 4 | −0.141 | −0.039 | 0.719 |
| 5 | −0.144 | −0.036 | 0.719 |
| 6 | −0.146 | −0.033 | 0.719 |
| 7 | −0.165 | 0.003 | 0.719 |
| 8 | −0.186 | 0.044 | 0.719 |
| 9 | −0.208 | 0.085 | 0.719 |
| 10 | −0.232 | 0.124 | 0.719 |
| 11 | −0.260 | 0.161 | 0.719 |
| 12 | −0.295 | 0.190 | 0.719 |
| 13 | −0.339 | 0.203 | 0.719 |
| 14 | −0.384 | 0.194 | 0.719 |
| 15 | −0.420 | 0.175 | 0.719 |
| 16 | −0.426 | 0.172 | 0.719 |
| 17 | −0.432 | 0.171 | 0.719 |
| 18 | −0.438 | 0.172 | 0.719 |
| 19 | −0.445 | 0.174 | 0.719 |
| 20 | −0.450 | 0.177 | 0.719 |
| 21 | −0.455 | 0.182 | 0.719 |
| 22 | −0.458 | 0.187 | 0.719 |
| 23 | −0.460 | 0.193 | 0.719 |
| 24 | −0.460 | 0.200 | 0.719 |
| 25 | −0.459 | 0.206 | 0.719 |
| 26 | −0.433 | 0.260 | 0.719 |
| 27 | −0.385 | 0.309 | 0.719 |
| 28 | −0.318 | 0.318 | 0.719 |
| 29 | −0.262 | 0.279 | 0.719 |
| 30 | −0.224 | 0.223 | 0.719 |
| 31 | −0.194 | 0.161 | 0.719 |
| 32 | −0.167 | 0.097 | 0.719 |
| 33 | −0.142 | 0.033 | 0.719 |
| 34 | −0.123 | −0.024 | 0.719 |
| 35 | −0.122 | −0.028 | 0.719 |
| 36 | −0.122 | −0.032 | 0.719 |
| 37 | −0.124 | −0.035 | 0.719 |
| 38 | −0.127 | −0.038 | 0.719 |
| 1 | −0.136 | −0.048 | 0.821 |
| 2 | −0.140 | −0.049 | 0.821 |
| 3 | −0.144 | −0.048 | 0.821 |
| 4 | −0.148 | −0.047 | 0.821 |
| 5 | −0.151 | −0.044 | 0.821 |
| 6 | −0.153 | −0.040 | 0.821 |
| 7 | −0.171 | −0.005 | 0.821 |
| 8 | −0.191 | 0.036 | 0.821 |
| 9 | −0.211 | 0.077 | 0.821 |
| 10 | −0.234 | 0.116 | 0.821 |
| 11 | −0.259 | 0.154 | 0.821 |
| 12 | −0.291 | 0.186 | 0.821 |
| 13 | −0.332 | 0.205 | 0.821 |
| 14 | −0.377 | 0.201 | 0.821 |
| 15 | −0.413 | 0.185 | 0.821 |
| 16 | −0.419 | 0.182 | 0.821 |
| 17 | −0.425 | 0.181 | 0.821 |
| 18 | −0.432 | 0.182 | 0.821 |
| 19 | −0.438 | 0.184 | 0.821 |
| 20 | −0.443 | 0.187 | 0.821 |
| 21 | −0.448 | 0.192 | 0.821 |
| 22 | −0.451 | 0.198 | 0.821 |
| 23 | −0.453 | 0.204 | 0.821 |
| 24 | −0.453 | 0.211 | 0.821 |
| 25 | −0.451 | 0.217 | 0.821 |
| 26 | −0.424 | 0.269 | 0.821 |
| 27 | −0.375 | 0.313 | 0.821 |
| 28 | −0.310 | 0.313 | 0.821 |
| 29 | −0.259 | 0.269 | 0.821 |
| 30 | −0.225 | 0.212 | 0.821 |
| 31 | −0.197 | 0.151 | 0.821 |
| 32 | −0.172 | 0.088 | 0.821 |
| 33 | −0.149 | 0.025 | 0.821 |
| 34 | −0.130 | −0.030 | 0.821 |
| 35 | −0.129 | −0.034 | 0.821 |
| 36 | −0.129 | −0.038 | 0.821 |
| 37 | −0.130 | −0.042 | 0.821 |
| 38 | −0.133 | −0.046 | 0.821 |
| 1 | −0.143 | −0.055 | 0.924 |
| 2 | −0.147 | −0.056 | 0.924 |

TABLE I-continued

[non-dimensionalized percentages]

| Point | X | Y | Z |
|---|---|---|---|
| 3 | −0.151 | −0.055 | 0.924 |
| 4 | −0.155 | −0.054 | 0.924 |
| 5 | −0.158 | −0.051 | 0.924 |
| 6 | −0.160 | −0.047 | 0.924 |
| 7 | −0.177 | −0.012 | 0.924 |
| 8 | −0.196 | 0.028 | 0.924 |
| 9 | −0.216 | 0.068 | 0.924 |
| 10 | −0.237 | 0.108 | 0.924 |
| 11 | −0.261 | 0.145 | 0.924 |
| 12 | −0.289 | 0.180 | 0.924 |
| 13 | −0.326 | 0.205 | 0.924 |
| 14 | −0.370 | 0.208 | 0.924 |
| 15 | −0.406 | 0.194 | 0.924 |
| 16 | −0.412 | 0.192 | 0.924 |
| 17 | −0.419 | 0.191 | 0.924 |
| 18 | −0.425 | 0.192 | 0.924 |
| 19 | −0.431 | 0.194 | 0.924 |
| 20 | −0.437 | 0.198 | 0.924 |
| 21 | −0.441 | 0.203 | 0.924 |
| 22 | −0.444 | 0.209 | 0.924 |
| 23 | −0.445 | 0.215 | 0.924 |
| 24 | −0.445 | 0.222 | 0.924 |
| 25 | −0.444 | 0.228 | 0.924 |
| 26 | −0.416 | 0.278 | 0.924 |
| 27 | −0.364 | 0.317 | 0.924 |
| 28 | −0.302 | 0.307 | 0.924 |
| 29 | −0.257 | 0.259 | 0.924 |
| 30 | −0.226 | 0.201 | 0.924 |
| 31 | −0.200 | 0.141 | 0.924 |
| 32 | −0.177 | 0.079 | 0.924 |
| 33 | −0.155 | 0.017 | 0.924 |
| 34 | −0.137 | −0.038 | 0.924 |
| 35 | −0.136 | −0.041 | 0.924 |
| 36 | −0.136 | −0.046 | 0.924 |
| 37 | −0.137 | −0.049 | 0.924 |
| 38 | −0.140 | −0.052 | 0.924 |

Embodiments of the disclosure may also include a turbine rotor blade stage (FIG. 2) for turbine section 108 including turbine rotor blade(s) 114 including the surface profile. Embodiments of the disclosure may also include turbine section 108 including turbine rotor blade(s) 114 including the surface profile. The apparatus and devices of the present disclosure are not limited to any one particular turbomachine, engine, turbine, jet engine, power generation system or other system, and may be used with turbomachines such as aircraft systems, power generation systems (e.g., simple cycle, combined cycle), and/or other systems (e.g., nuclear reactor). Additionally, the apparatus of the present disclosure may be used with other systems not described herein that may benefit from the increased efficiency of the apparatus and devices described herein.

Embodiments of the disclosure provide various technical and commercial advantages, examples of which are discussed herein. The disclosed airfoil shape provides a unique surface profile to achieve a reduction in local heat transfer coefficient, which when coupled with an improved ability to package cooling holes closer to the leading edge due to the leading edge shape, results in considerable decrease of local temperatures, reduced oxidation and subsequently a substantial increase in part life. The specific airfoil leading edge geometry also maintains aerodynamic performance and turbine efficiency. Hence, the disclosed loci of points defined in TABLE I allow GT system 100 or any other suitable turbine system to run in an efficient, safe and smooth manner.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "substantially" as applied to a particular value of a range applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and its practical application and to enable others of ordinary skill in the art to understand the disclosure such that various modifications as are suited to a particular use may be further contemplated.

We claim:

1. A turbine rotor blade comprising:

an airfoil having: a suction side, a pressure side opposing the suction side, a leading edge spanning between the pressure side and the suction side, and a trailing edge opposing the leading edge and spanning between the pressure side and the suction side; and an endwall connected with the airfoil along the suction side, the pressure side, the trailing edge and the leading edge, the endwall defining an origin at a pressure side, aftmost point;

wherein the airfoil has a shape having a nominal profile substantially in accordance with Cartesian coordinate values of X, Y and Z set forth in TABLE I and originating at the origin, wherein the Cartesian coordinate values are non-dimensional values of from 0% to 100% convertible to distances by multiplying the values by a height of the airfoil expressed in units of distance, and wherein X and Y values connected by smooth continuing arcs define airfoil profile sections at each distance Z along at least a portion of the airfoil, the airfoil profile sections at the Z distances being joined smoothly with one another to form the nominal profile.

2. The turbine rotor blade of claim 1, wherein the turbine rotor blade includes a first stage blade.

3. The turbine rotor blade of claim 1, further comprising a fillet connecting a surface of the endwall to a surface of the airfoil.

4. The turbine rotor blade of claim 1, wherein the shape having the nominal profile substantially in accordance with the Cartesian coordinate values of X, Y and Z set forth in TABLE I includes the airfoil profile sections defined within 10% and 92% of the height of the airfoil.

5. A turbine rotor blade stage for a turbine section of a turbomachine, the turbine rotor blade stage comprising:

a set of turbine rotor blades, the set of turbine rotor blades including at least one turbine rotor blade having:

an airfoil having: a suction side, a pressure side opposing the suction side, a leading edge spanning between the pressure side and the suction side, and a trailing edge opposing the leading edge and spanning between the pressure side and the suction side; and an endwall connected with the airfoil along the suction side, the pressure side, the trailing edge and the leading edge, the endwall defining an origin at a pressure side, aftmost point;

wherein the airfoil has a shape having a nominal profile substantially in accordance with Cartesian coordinate values of X, Y and Z set forth in TABLE I and originating at the origin, wherein the Cartesian coordinate values are non-dimensional values of from 0% to 100% convertible to distances by multiplying the values by a height of the airfoil expressed in units of distance, and wherein X and Y values connected by smooth continuing arcs define airfoil profile sections at each distance Z along at least a portion of the airfoil, the airfoil profile sections at the Z distances being joined smoothly with one another to form the nominal profile.

6. The turbine rotor blade stage of claim 5, further comprising a fillet connecting a surface of the endwall to a surface of the airfoil.

7. The turbine rotor blade stage of claim 5, wherein the turbine rotor blade stage is a first stage blade section.

8. The turbine rotor blade stage of claim 5, wherein the shape having the nominal profile substantially in accordance with Cartesian coordinate values of X, Y and Z set forth in TABLE I includes the airfoil profile sections defined within 10% and 92% of the height of the airfoil.

9. A turbine section comprising a plurality of turbine stages each having a plurality of turbine rotor blades, each of the plurality of turbine rotor blades in a respective turbine stage comprising:

an airfoil having: a suction side, a pressure side opposing the suction side, a leading edge spanning between the pressure side and the suction side, and a trailing edge opposing the leading edge and spanning between the pressure side and the suction side; and an endwall connected with the airfoil along the suction side, the pressure side, the trailing edge and the leading edge, the endwall defining an origin at a pressure side, aftmost point;

wherein the airfoil has a shape having a nominal profile substantially in accordance with Cartesian coordinate values of X, Y and Z set forth in TABLE I and originating at the origin, wherein the Cartesian coordinate values are non-dimensional values of from 0% to 100% convertible to distances by multiplying the values by a height of the airfoil expressed in units of distance, and wherein X and Y values connected by smooth continuing arcs define airfoil profile sections at each distance Z along at least a portion of the airfoil, the airfoil profile sections at the Z distances being joined smoothly with one another to form the nominal profile.

10. The turbine section of claim 9, further comprising a fillet connecting a surface of the endwall to a surface of the airfoil.

11. The turbine section of claim 9, wherein the respective turbine stage is a first turbine stage, and the plurality of turbine rotor blades includes first stage rotor blades.

12. The turbine section of claim 9, wherein the shape having the nominal profile substantially in accordance with the Cartesian coordinate values of X, Y and Z set forth in TABLE I includes the airfoil profile sections defined within 10% and 92% of the height of the airfoil.

13. The turbine section of claim 9, wherein the leading edge includes a cooling channel extending through the airfoil that results in a decrease of local temperatures while maintaining aerodynamic performance and minimizing decreases in efficiency of the turbine section.

* * * * *